(12) United States Patent
Oishi et al.

(10) Patent No.: US 7,263,713 B2
(45) Date of Patent: Aug. 28, 2007

(54) TELEVISION SIGNAL DISTRIBUTOR APPARATUS, RECEIVER APPARATUS, TELEVISION SIGNAL TRANSMISSION SYSTEM AND METHOD

(75) Inventors: Katsumi Oishi, Tokyo (JP); Keiji Fukuzawa, Chiba (JP); Kenji Inose, Tokyo (JP)

(73) Assignee: Sony Corporation, Tokyo (JP)

( * ) Notice: Subject to any disclaimer, the term of this patent is extended or adjusted under 35 U.S.C. 154(b) by 891 days.

(21) Appl. No.: 09/791,705

(22) Filed: Feb. 26, 2001

(65) Prior Publication Data

US 2002/0056140 A1 May 9, 2002

(30) Foreign Application Priority Data

Mar. 1, 2000 (JP) .............................. 2000-055497

(51) Int. Cl.
*H04N 7/173* (2006.01)

(52) U.S. Cl. ........................ 725/117; 725/114; 725/118; 725/67; 725/68; 725/71; 725/126; 725/131; 725/138; 725/139; 725/144; 725/148; 725/151; 455/3.02; 455/42; 455/46; 455/500; 455/509; 455/103; 455/104; 455/105; 455/118; 455/131; 370/480; 370/486; 370/487; 348/723; 348/724; 348/725; 348/726; 348/731; 348/732

(58) Field of Classification Search .................. 725/67, 725/68, 71, 114, 117, 118, 126, 131, 138–139, 725/144, 148, 151; 455/3.02, 42, 46, 500, 455/509, 103–105, 118, 131; 370/480, 486, 370/487; 348/723, 724, 725, 726, 731, 732; 375/267, 316, 211, 347, 130, 34.4, 344, 137

See application file for complete search history.

(56) References Cited

U.S. PATENT DOCUMENTS

| | | | | |
|---|---|---|---|---|
| 5,301,352 A | * | 4/1994 | Nakagawa et al. ........... 725/71 |
| 5,469,431 A | * | 11/1995 | Wendorf et al. ............. 370/254 |
| 5,886,995 A | * | 3/1999 | Arsenault et al. ........... 370/477 |
| 5,923,642 A | * | 7/1999 | Young ........................ 370/206 |
| 5,926,207 A | * | 7/1999 | Vaughan et al. ............ 725/139 |
| 6,011,950 A | * | 1/2000 | Young ......................... 725/67 |
| 6,038,433 A | * | 3/2000 | Vegt ........................ 455/161.1 |
| 6,134,419 A | * | 10/2000 | Williams ..................... 725/151 |
| 6,160,545 A | * | 12/2000 | Eyer et al. .................. 345/721 |
| 6,215,530 B1 | * | 4/2001 | Wasilewski ................. 348/731 |
| 6,452,989 B1 | * | 9/2002 | Friedman .................... 375/347 |

(Continued)

*Primary Examiner*—Jason P. Salce
(74) *Attorney, Agent, or Firm*—Oblon, Spivak, McClelland, Maier & Neustadt, P.C.

(57) ABSTRACT

In a television signal transmission system, CS broadcasting signals received via a master antenna are converted into intermediate frequency signals in an LNB (Low Noise Block Down Converter). The CS intermediate frequency signals then undergo conversion of the modulation format, for example, from QPSK into 64-QAM, so that CS broadcasting signals from each transponder, having a bandwidth of, for example, 27 MHz, are accommodated in a narrower bandwidth, for example, 6 MHz, which is equivalent to one channel of terrestrial broadcasting services. Then, the signals accommodated in the narrower bandwidth is frequency-shifted into a vacant frequency band in the VHF band or the UHF band. Accordingly, the CS signals accommodated in the narrower band and frequency-shifted into the vacant band are multiplexed with terrestrial broadcasting signals in the VHF and UHF bands and BS intermediate frequency signals so that all these signals are delivered to each household via a single cable.

11 Claims, 10 Drawing Sheets

U.S. PATENT DOCUMENTS

| | | | |
|---|---|---|---|
| 6,483,547 B1 * | 11/2002 | Eyer | 348/473 |
| 6,549,582 B1 * | 4/2003 | Friedman | 375/260 |
| 6,600,730 B1 * | 7/2003 | Davis et al. | 370/343 |
| 6,622,307 B1 * | 9/2003 | Ho | 725/120 |

* cited by examiner

| DATA STRUCTURE | BIT |
|---|---|
| network_information_table()[ | |
|     table_id | 8 |
|     section_syntax_indicator | 1 |
|     reserved_future_use | 1 |
|     reserved | 2 |
|     section_length | 12 |
|     network_id | 16 |
|     reserved | 2 |
|     version_number | 5 |
|     current_next_indicator | 1 |
|     section_number | 8 |
|     last_section_number | 6 |
|     reserved_future_use | 4 |
|     network_descriptor_length | 12 |
|         for ( i = 0 : i < N : i++ )[ | |
|             descriptor() | |
|     ] | |
|     reserved_future_use | 4 |
|     transport_stream_loop_length | 12 |
|     for ( i = 0 : i < N : i++ )[ | |
|         transport_stream_id | 16 |
|         original_network_id | 16 |
|         reserved_future_use | 4 |
|         transport_stream_length | 12 |
|         for ( j = 0 : j < N : j++ )[ | |
|         descriptor() | |
|     } | |
|     ] | |
|   CRS_32 | 32 |
| ] | |

FIG. 8

| DATA STRUCTURE | BIT |
|---|---|
| satellite_delivery_system_descriptor()[ <br>     descriptor_tag <br>     descriptor_length <br>     frequency <br>     orbital_position <br>     west_east_flag <br>     polarisation <br>     modulation <br>     symbol_rate <br>     FEC_inner <br> ] | <br> 8 <br> 8 <br> 32 <br> 16 <br> 1 <br> 2 <br> 5 <br> 28 <br> 4 |

FIG. 9

| DATA STRUCTURE | BIT |
|---|---|
| service_listdescriptor(){ <br>     descriptor_tag <br>     descriptor_length <br>     for ( i = 0 ; i < N : i ++)[ <br>         service_id <br>         service_type <br>     } <br> ] | <br> 8 <br> 8 <br> <br> 16 <br> 8 |

TELEVISION SIGNAL DISTRIBUTOR APPARATUS, RECEIVER APPARATUS, TELEVISION SIGNAL TRANSMISSION SYSTEM AND METHOD

BACKGROUND OF THE INVENTION

1. Field of the Invention

The present invention generally relates to television signal distributor apparatuses, receiver apparatuses, and television signal transmission systems and methods. More specifically, the present invention relates to a television signal distributor apparatus, a receiver apparatus, a television signal transmission system and method, which are particularly suitable for implementing a small-scale television signal distribution network in which television signals received via a master antenna provided on the rooftop at collective housing, such as an apartment building, are delivered to each household via a cable.

2. Description of the Related Art

In collective housing such as an apartment building, there is usually provided a television signal transmission system in which television signals received via a master antenna provided on the rooftop are delivered to each household via a cable. In VHF-band and UHF-band terrestrial broadcasting services, broadcasting stations are allocated with respectively different frequency bands. The television signal transmission system mixes signals received via a VHF antenna and a UHF antenna while adjusting the gain thereof, and then delivers the mixed signals to each household via a single cable.

Recently, BS (broadcasting satellite) broadcasting services are available as well as VHF-band and UHF-band terrestrial broadcasting services. BS broadcasting signals are transmitted on electromagnetic waves in the 12-GHz band, and the signals received via a parabola antenna are converted into intermediate frequency signals in the 1-GHz band in an LNB (Low Noise Block Down Converter) provided in association with the parabola antenna. The BS intermediate frequency signals in the 1-GHz band do not overlap the terrestrial broadcasting signals in the VHF and UHF bands. Thus, it is feasible to mix the 1-GHz band BS intermediate frequency signals and the VHF-band and UHF-band terrestrial broadcasting signals so that the mixed signals are delivered to each household via a single cable.

Furthermore, with the increasing popularity of CS broadcasting services, it is desired that a television signal transmission system which delivers CS broadcasting signals via a cable to each household be provided in collective housing such as an apartment building.

However, CS broadcasting signals are broadcast using the 12-GHz band and CS intermediate frequency signals are in the 1-GHz band, which overlaps the band allocated for BS intermediate frequency signals. Thus, it is not feasible to simply mix the CS intermediate frequency signals, the BS intermediate frequency signals, and the VHF-band and UHF-band terrestrial broadcasting signals and to deliver all these signals to each household via a single cable.

More specifically, BS broadcasting signals and CS broadcasting signals are both broadcast using the same 12-GHz Ku band, the local oscillation frequencies of LNBs for BS broadcasting signals and CS broadcasting signals being, respectively, 10.678 GHz and 11.2 GHz. Furthermore, CS broadcasting signals includes both vertically polarized signals and horizontally polarized signals. Thus, there exists an overlap between the frequency band BS-IF for the BS intermediate frequency signals and the frequency band CS-IF for the CS intermediate frequency signals. Accordingly, it is not feasible to simply mix the CS intermediate frequency signals, the BS intermediate frequency signals, and the VHF-band and UHF-band terrestrial broadcasting signals, and to deliver all these signals to each household via a single cable.

In view of the above, in conventional television signal transmission systems which are made compatible with CS broadcasting signals, CS intermediate frequency signals are frequency-shifted into the frequency bands above the frequency band for BS intermediate frequency signals.

Figure 1:
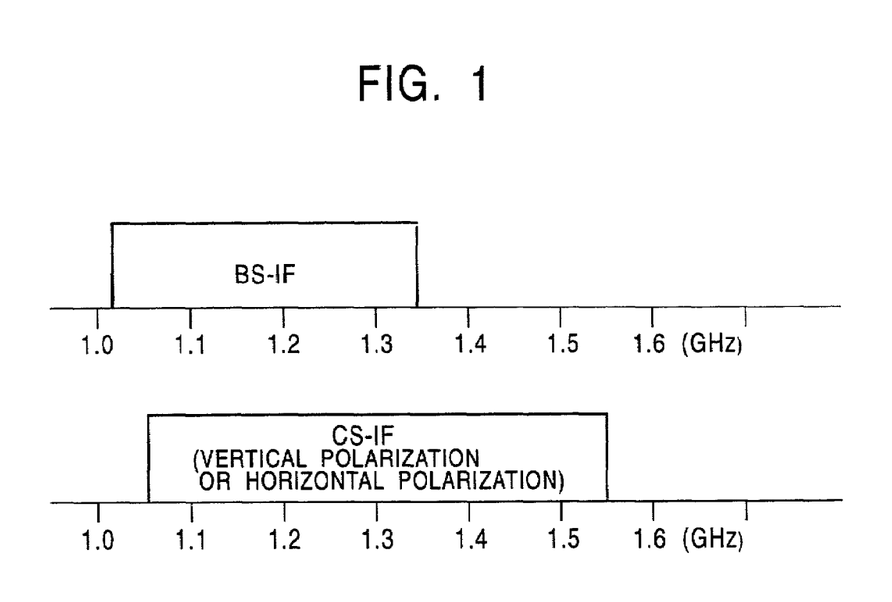
FIG. 1 is a schematic representation of the frequency allocation for BS intermediate frequency signals and CS intermediate frequency signals in the conventional television signals transmission system.
Figure 2:
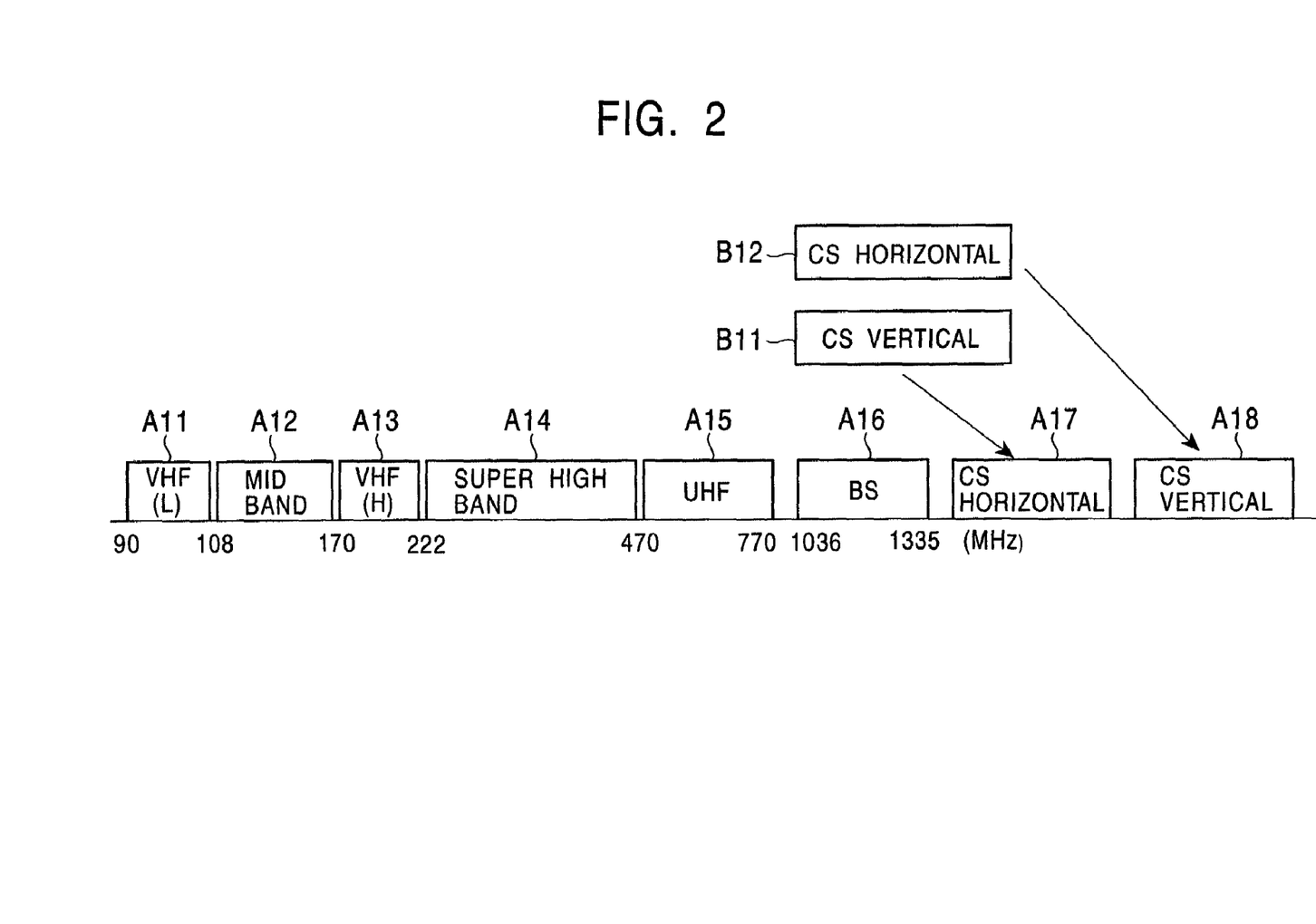
FIG. 2 is a schematic representation of the overall frequency allocation in the conventional master antenna system.

More specifically, when BS intermediate frequency signals and the VHF-band and UHF-band terrestrial broadcasting signals are mixed for transmission via the same cable in the conventional television signal transmission systems, the frequency allocation of the mixed signals is as shown in FIG. 2. Referring to FIG. 2, the frequency allocation includes the VHF low band A11, the VHF mid band A12, the VHF high band A13, the VHF super high band A14, the UHF band A15, and the frequency band A16 for BS intermediate frequency signals. When CS intermediate frequency signals are also mixed with the BS intermediate frequency signals and the VHF-band and UHF-band terrestrial broadcasting signals for transmission via the same cable, frequency bands A17 and A18 above the frequency band A16 for BS intermediate frequency signals are allocated respectively for vertically polarized signals and horizontally polarized signals of the CS intermediate frequency signals. The vertically polarized signals and the horizontally polarized signals of the CS intermediate frequency signals in the 1-GHz band B11 and B12 are frequency-shifted into the frequency bands A17 and A18.

As described above, by frequency-shifting CS intermediate frequency signals so that the CS intermediate frequency signals are allocated in the frequency bands A17 and A18 above the frequency band A16 for BS intermediate frequency signals, the frequency band A16 for BS intermediate frequency signals and the frequency bands A17 and A18 for CS intermediate frequency signals do not overlap, allowing the VHF-band and UHF-band terrestrial broadcasting signals, the BS intermediate frequency signals, and the CS intermediate frequency signals to be transmitted via a single cable.

However, some broadcasting services employ two satellites for broadcasting, for example, the Japanese SKY PerfecTV. In that case, vertically polarized signals and horizontally polarized signals from each of the two satellites are transmitted using the same carrier frequency.

Thus, if the CS intermediate frequency signals are frequency-shifted into a frequency band above the frequency band for the BS intermediate frequency signals, the frequency allocation extends up to an extremely high frequency in order to accommodate the vertically polarized signals and horizontally polarized signals from each of the two satellites.

More specifically, a single band for CS intermediate frequency signals requires a bandwidth on the order of 500 MHz. Thus, in order to accommodate all the four signals, the required bandwidth is on the order of 500 MHz×4=2000 MHz. If the 2,000-MHz is allocated above the frequency band for BS intermediate frequency signals, i.e., 1,035 MHz to 1,335 MHz, the frequency allocation extends up to as high as approximately 3,500 MHz.

The frequency range compatible with the current transmission apparatuses is up to approximately 2,150 MHz; thus, compatibility with the frequency range of up to 3,500 MHz poses a technical difficulty of developing new apparatuses. In addition, implementation of such a system in a wide area involves sophisticated design techniques which are beyond the techniques of ordinary works.

It may be technically possible to provide a separate cable for transmission of CS intermediate frequency signals in addition to a cable for transmission of terrestrial broadcasting signals in the VHF and UHF bands and BS intermediate frequency signals, so that the CS intermediate frequency signals can be transmitted to each household even if the CS broadcasting service employs two or more satellites. However, the approach requires the complex work of providing new cables in existing collective housing, which is quite costly. In addition, if separate cables are provided for terrestrial broadcasting signals in the VHF and UHF bands and BS intermediate frequency signals, and for CS intermediate frequency signals, respectively, an additional equipment for switching between the cables is required at each household.

SUMMARY OF THE INVENTION

Accordingly, it is an object of the present invention to provide a television signal distribution apparatus, a receiver apparatus, and a television signal transmission system and method, which allows, without implementing large-scale works, terrestrial broadcasting signals in the VHF and UHF bands, the BS intermediate frequency signals, and CS intermediate frequency signals of a CS broadcasting service which employs two or more satellites to be multiplexed for transmission to each household via a single cable.

To this end, the present invention provides a television signal transmission system including a television signal distributor apparatus which delivers signals received via a master antenna to each household via a cable; and at least one receiver apparatus provided in each household. The television signal distributor apparatus includes a modulation format converting unit for converting the modulation format of received CS broadcast signals to thereby accommodate the signals in a narrower bandwidth, and for frequency-shifting the signals accommodated in the narrower bandwidth into a vacant frequency band; and a mixing unit for mixing for transmission via the cable the frequency-shifted signals accommodated in said narrower bandwidth with other type or types of received broadcast signals. The at least one receiver apparatus includes a receiving unit for receiving CS broadcast signals which have undergone conversion of modulation format so as to be accommodated in a narrower bandwidth and which have then been frequency-shifted into a vacant frequency band; a demodulating unit for demodulating the received signals in accordance with the modulation format after conversion; and a decoding unit for decoding the output from the demodulating unit to obtain video signals and audio signals.

In accordance with the present invention, the modulation format of CS intermediate frequency signals is converted, for example, from QPSK to 64-QAM; thus, CS broadcasting signals from each transponder, having a bandwidth of, for example, 27 MHz, are accommodated in a bandwidth of, for example, 6 MHz, which is equivalent to a single channel for terrestrial broadcasting. The CS signals which have undergone conversion of the modulation format are frequency-shifted into a vacant channel in the VHF band or the UHF band. The frequency-shifted CS signals are multiplexed with BS intermediate frequency signals and terrestrial broadcasting signals for transmission to each household via a single cable. Accordingly, signals for a CS broadcasting service, even if provided via two or more satellites, can be transmitted to each household via a single cable together with signals for a BS broadcasting service and terrestrial broadcasting signals.

DESCRIPTION OF THE PREFERRED EMBODIMENT

A preferred embodiment of the present invention will be described below with reference to the accompanying drawings.

The present invention is particularly suitable for implementing a television signal transmission system in which signals received via a master antenna are delivered to each household via a cable, for example, a small-scale television signal transmission system provided at collective housing such as an apartment building.

In accordance with the present invention, CS broadcasting signals from each transponder received via a master antenna undergo conversion of the modulation format so that the signals are accommodated in a narrower bandwidth. The signals accommodated in the narrower bandwidth are then frequency-shifted into a vacant channel in the VHF band or the UHF band. This eliminates the need to provide an additional band for the CS broadcasting signals; thus, the CS broadcasting signals, even if serviced by two or more satellites, can be delivered to each household via a single cable together with terrestrial television broadcasting signals and BS broadcasting signals.

Figure 3:
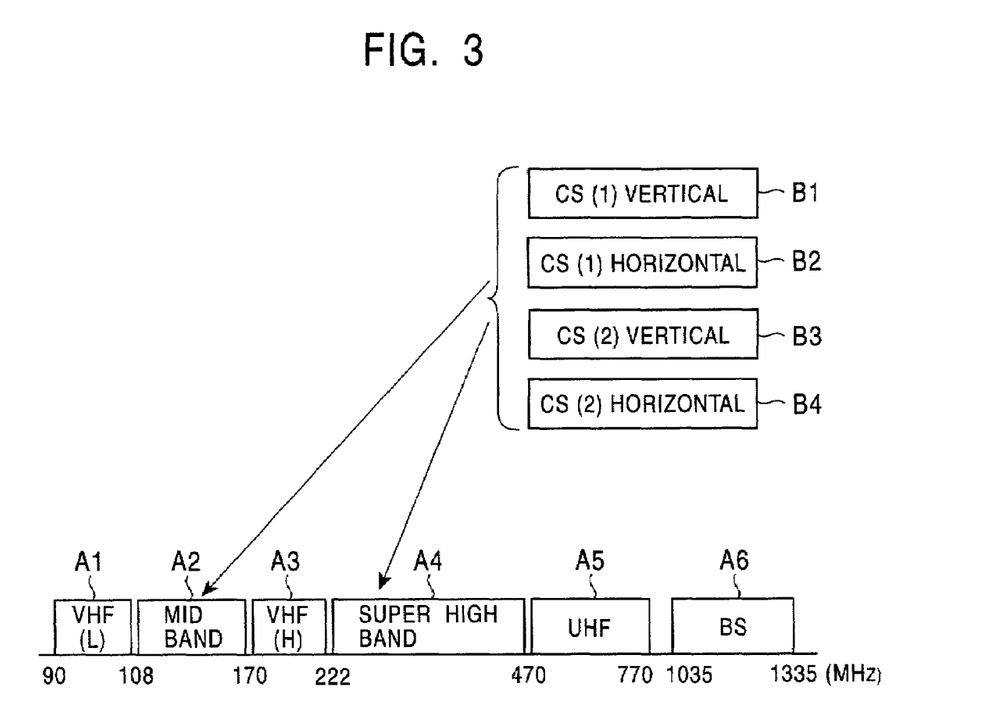
FIG. 3 is a schematic representation of the frequency allocation in an embodiment of the present invention.

FIG. 3 shows the frequency allocation of signals transmitted via a cable. Referring to FIG. 3, A1 (90 MHz to 108 MHz) is the VHF low band, A2 (108 MHz to 170 MHz) is the VHF mid band, A3 (170 MHz to 222 MHz) is the VHF high band, A4 (222 MHz to 470 MHz) is the VHF super high band, A5 (470 MHz to 770 MHz) is the UHF band, and A6 (1035 MHz to 1335 MHz) is a band for intermediate frequency signals of BS broadcasting signals. Currently, the VHF low band A1 and the VHF high band A3 are used for VHF terrestrial television broadcasting, and the UHF band A5 is used for UHF terrestrial television broadcasting. The VHF mid band A2 and the VHF super high band A4 are allocated for CATV (Cable Television); and therefore, the bands are vacant where CATV service is not used. The BS broadcasting signals are broadcast on electromagnetic waves in the 12-GHz band. When received via a parabola antenna, the BS broadcasting signals are converted into intermediate frequency signals in the 1-GHz band in an LNB (Low Noise Block Down Converter) provided in association with the parabola antenna.

CS broadcasting signals are also broadcast on electromagnetic waves in the 12-GHz band, and include vertically polarized signals and horizontally polarized signals. In the case of a CS service which employs two satellites, signals from one satellite and signals from the other respectively includes vertical polarization signals and horizontal polarization signals. For example, the Japanese SKY PerfecTV employs two satellites for its broadcasting service, and signals from each of the two satellites includes vertically polarized signals and horizontally polarized signals. The CS broadcasting signals in the 12-GHz band are converted into intermediate frequency signals in the 1-GHz band in an LNB provided in association with a parabola antenna. In order to accommodate the CS broadcasting signals, there are provided four bands B1, B2, B3, and B4 corresponding to vertically polarized signals and horizontally polarized signals from each of the two satellites. The bands B1 to B4 overlap the band A6 for intermediate frequency signals of BS broadcasting signals. Thus, it is not feasible to simply mix CS intermediate frequency signals, BS intermediate frequency signals, and terrestrial television broadcasting signals in the VHF and UHF bands and to deliver all these signals to each household via a single cable.

As described above, the VHF mid band A2 and the VHF super high band A4 are allocated for CATV. However, the bands A2 and A4 are actually vacant where CATV service is not used, typically, in a small-scale signal transmission system such as one provided at an apartment building. In addition, the UHF band A5 is used only for retransmission by several local terrestrial broadcasting stations.

Accordingly, it may be feasible to accommodate CS intermediate frequency signals in the VHF mid band A2, super high band A4, and the UHF band A5, or any other frequency bands if available, so that the CS intermediate frequency signals are transmitted.

However, the bandwidth for CS signals from each transponder is typically as broad as 27 MHz, while the bandwidth for a single channel of terrestrial television broadcasting service is typically as narrow as 6 MHz. Thus, it is not feasible to directly frequency-shift CS signals transmitted from a transponder into a terrestrial broadcast channel.

Accordingly, in one embodiment of the present invention, the modulation format of CS intermediate frequency signals is converted from QPSK (Quadrature Phase Shift Keying) to 64-QAM (Quadrature Amplitude Modulation) so that the CS intermediate frequency signals can be accommodated in a channel for terrestrial broadcasting.

CS broadcasting employs QPSK for modulation of signals. QPSK uses four carrier waves 90 degrees out of phase with one another. 64-QAM samples 64 values at separate points. QPSK enables narrower bandwidth and transmission of a great amount of data compared with QPSK. Thus, by converting the modulation format from QPSK to 64-QAM, it becomes possible to transmit the CS signal having a bandwidth of 27 MHz in a terrestrial broadcast channel having a bandwidth of 6 MHz.

Thus, in accordance with the embodiment, the CS intermediate frequency signals in the bands B1 to B4 are accommodated in a narrower bandwidth through conversion of the modulation format from QPSK to 64-QAM, and are frequency-shifted to an empty channel such as the VHF mid band A2, the VHF super high band A4, and the UHF band A5. This allows transmission of the CS intermediate frequency signals, BS intermediate frequency signals, and terrestrial broadcasting signals in the VHF and UHF bands via a single cable to each household. The conversion of modulation format does not diminish the information content of the CS intermediate frequency signals, and thus does not cause degradation of picture and sound qualities.

Currently, a CS service employing two satellites uses 32 carrier waves. Because the number of available 6-MHz channels is ten for the VHF mid band A2, and 41 for the VHF super high band A4, all of the 32 carrier waves can be accommodated for transmission.

Figure 4:
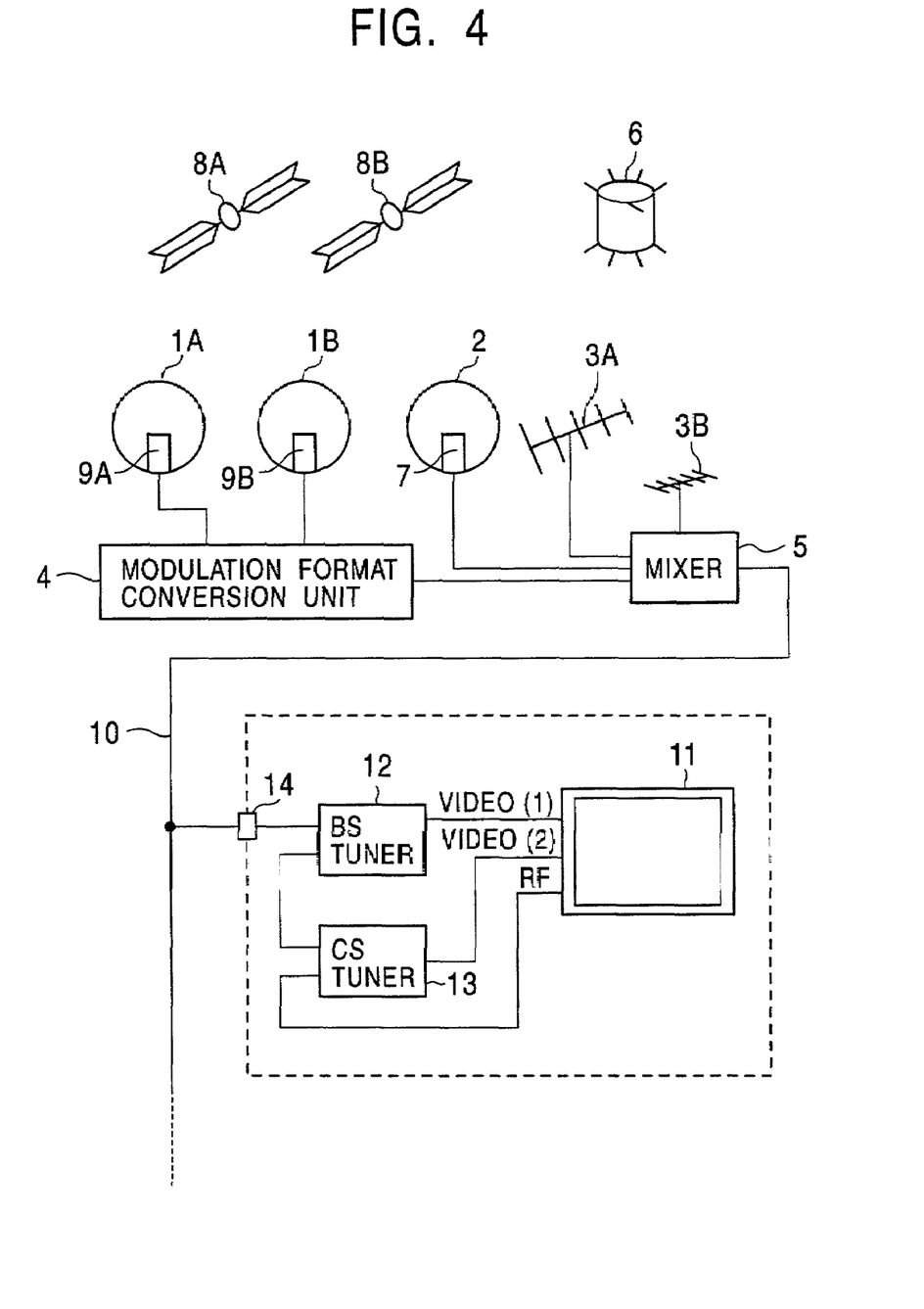
FIG. 4 is a block diagram showing the overall construction of a television signals transmission system according to the embodiment, together with other associated systems.

FIG. 4 illustrates the overall construction of a television signal transmission system, as connected to associated systems, according to the embodiment of present invention. Referring to FIG. 4, there are shown parabola antennas 1A and 1B for receiving CS broadcasting signals, a parabola antenna 2 for receiving BS broadcasting signals, and antennas 3A and 3B for receiving terrestrial broadcasting signals respectively in the VHF band and in the UHF band. The antennas 1A, 1B, 2, 3A, and 3B are master antennas, and are provided, for example, on the rooftop of an apartment building.

The CS parabola antennas 1A and 1B receive signals transmitted from two communications satellites 8A and 8B. The parabola antennas 1A and 1B are provided with LNBs 9A and 9B, respectively. The LNBs 9A and 9B converts CS broadcasting signals in the 12-GHz band into intermediate frequency signals. The outputs of the LNBs 9A and 9B are fed to a modulation format conversion unit 4.

The modulation format conversion unit 4 converts the modulation format of the CS intermediate signals, for example, from QPSK to 64-QAM, to accommodate the signals in a narrower bandwidth. The modulation format conversion unit 4 then frequency-shifts the signals accommodated in the narrower bandwidth into a vacant channel in the VHF band or in the UHF band. The output of the modulation format conversion unit 4 is fed to a mixer 5.

The BS parabola antenna 2 receives signals from a broadcasting satellite 6. The parabola antenna 2 is provided with an LNB 7. The LNB 7 converts signals in the 12-GHz band received by the parabola antenna 2 into intermediate frequency signals in the 1-GHz band. The output of the LNB 7 is fed to the mixer 5.

The antennas 3A and 3B receive terrestrial broadcasting signals in the VHF and UHF bands. The outputs of the antennas 3A and 3B are fed to the mixer 5.

The mixer 5 mixes the output from the modulation format conversion unit 4, the output from the LNB 7, and the output from the antennas 3A and 3B.

The output of the mixer 5 is fed through a cable 10 and via a distributor to a terminal 14 in each household.

Each household is provided with a television receiver 11, a BS tuner 12, and a CS tuner 13 compatible with the television signal transmission system. The television receiver 11 has two external video/audio input terminals.

Of the signals transmitted via the cable 10, the BS intermediate frequency signals are fed to the BS tuner 12 via the terminal 14. The BS tuner 12 demodulates the BS intermediate frequency signals to obtain video signals and audio signals, for example, in the NTSC format. The output of the BS tuner 12 is fed to one of the external video/audio input terminals Video(1) of the television receiver 11.

The CS intermediate frequency signals which have undergone conversion of the modulation format and which have been frequency-shifted are fed from the terminal 14 via an RF through circuit and a distributor circuit of the BS tuner 12 to the CS tuner 13. The CS tuner 13 demodulates the CS intermediate frequency signals to obtain video signals and audio signals, for example, in the NTSC format. The output of the CS tuner 12 is fed to the other external video/audio input terminal Video(2) of the television receiver 11.

The terrestrial broadcasting signals are fed from the terminal 14, through the BS tuner 12 and the CS tuner 13, to an RF input terminal of the television receiver 11.

As described above, in the television signal transmission system shown in FIG. 4, the modulation format conversion unit 4 converts the modulation format of the CS intermediate frequency signals so as to accommodate the signals in a narrower bandwidth, and frequency-shifts the signals into a vacant band in the VHF band or in the UHF band. Then, the output of the modulation format conversion unit 4 is multiplexed in the mixer 5 with the BS intermediate frequency signals and terrestrial broadcasting signals in the VHF and UHF bands, so that the mixed signals are transmitted to each household via the cable 10.

In each household, the BS tuner 12 demodulates the BS intermediate frequency signals, and outputs corresponding video and audio signals to the external video/audio input terminal Video(1) of the television receiver 11. The CS tuner 13 decodes the CS intermediate frequency signals and outputs corresponding video and audio signals to the external video/audio input terminal Video(2) of the television receiver 11. The terrestrial broadcasting signals in the VHF and UHF bands are input to the RF input terminal of the television receiver 11.

Accordingly, when the RF input is selected, the television receiver 11 reproduces the picture and sound of terrestrial television broadcasting in the VHF and UHF bands. When the external video/audio input Video(1) is selected, the television receiver 11 reproduces the picture and sound of BS broadcasting based on the output of the BS tuner 12. When the external video/audio input Video(2) is selected, the television receiver 11 reproduces the picture and sound of CS broadcasting based on the output of the CS tuner 13.

Figure 5:
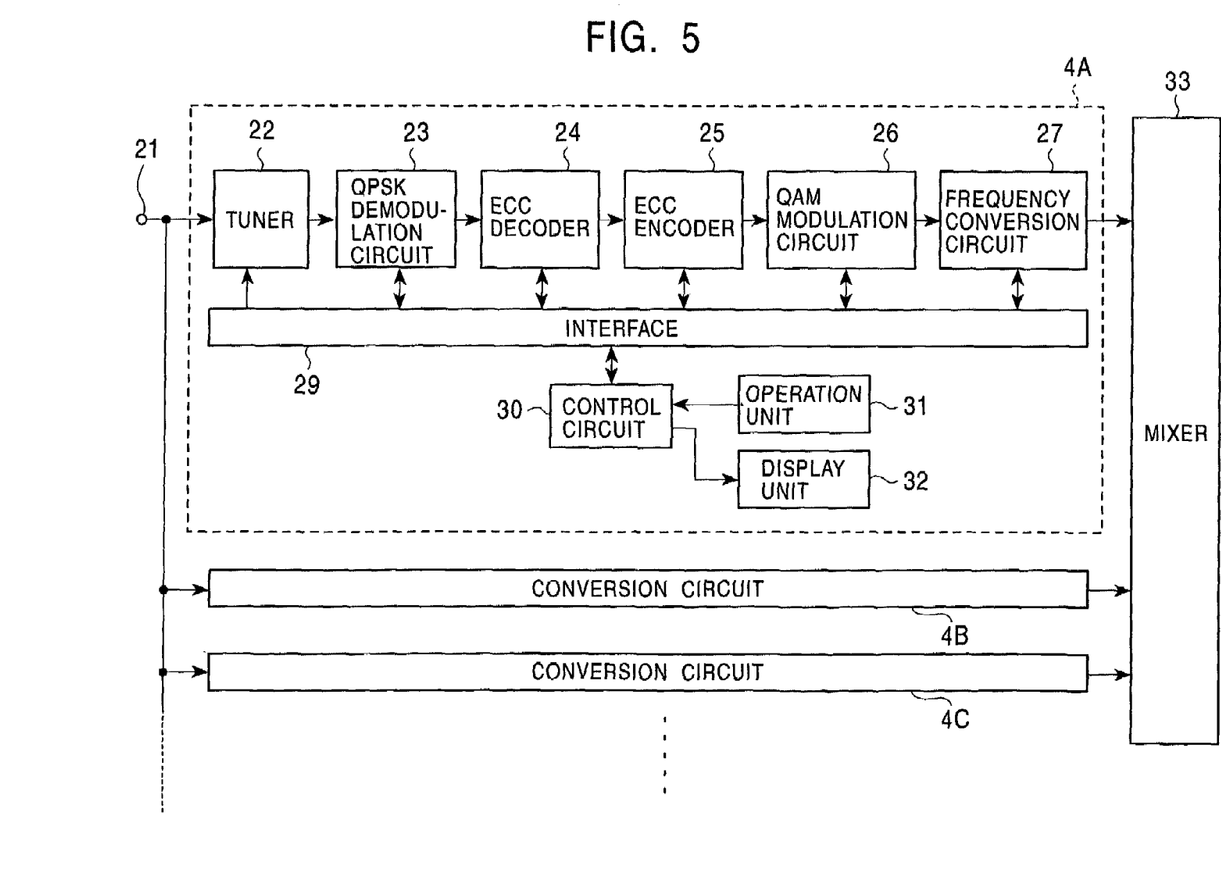
FIG. 5 is a block diagram of an example of a modulation format conversion unit in the embodiment.

FIG. 5 shows the construction of the modulation format conversion unit 4. As described above, the modulation format conversion unit 4 receives CS intermediate frequency signals from the LNBs 9A and 9B provided in association with the parabola antennas 1A and 1B, converts the modulation format of the CS intermediate frequency signals from QPSK to 64-QAM, and frequency-shifts the signals into a vacant channel in the VHF band or the UHF band.

The modulation format conversion unit 4 includes conversion circuits 4A, 4B, 4C, etc. The conversion circuits 4A, 4B, 4C, etc. receive CS intermediate frequency signals corresponding to the vertically polarized and horizontally polarized signals from each of the two satellites 8A and 8B, converts the modulation format of the signals, and frequency-shifts the signals into a vacant band for terrestrial television broadcasting. The conversion circuits 4A, 4B, 4C, etc. are configured identical to one another.

Referring to FIG. 5, CS intermediate frequency signals output from the LNBs 9A and 9B of the parabola antennas 1A and 1B are fed to an input terminal 21. The signals input to the input terminal 21 are fed to each tuner circuit 22 of the modulation circuit 4A, 4B, 4C, etc. The tuner circuit 22 selects signals on a desired carrier wave.

The output of the tuner circuit 22 is fed to a QPSK demodulation circuit 23. The QPSK demodulation circuit 23 demodulates the signals modulated by QPSK. The output of the QPSK circuit 23 is fed to an ECC (Error Correction Code) decoder 24. The output of the ECC decoder 24 is fed to an ECC encoder 25.

The ECC decoder 24 and the ECC encoder 25 reassign error correction codes to the signals. CS broadcasting signals use Reed-Solomon codes and convolutional codes for error correction; however, only Reed-Solomon codes are used when error correction codes are reassigned. The ECC decoder 24 decodes the signals using Reed-Solomon codes and convolutional codes, and the ECC encoder 25 encodes the decoded signals using Reed-Solomon codes only.

The output of the ECC encoder 25 is fed to a QAM modulation circuit 26. The QAM modulation circuit 26 modulates the signals by 64-QAM. The output of the QAM modulation circuit 26 is fed to a frequency conversion circuit 27. The frequency conversion circuit 27 frequency-shifts the signals into a vacant band in the VHF band or the UHF band. The output of the frequency conversion circuit 27 is fed to the mixer 33.

The tuner circuit 22, the QPSK demodulation circuit 23, the ECC decoder 24, the ECC encoder 25, the QAM modulation circuit 26, and the frequency conversion circuit 27 are controlled by a control circuit 30 via an interface 29. The control circuit is connected to an operation unit 31 which allows setting and to a display unit 32 for displaying the setting.

As described above, in each of the conversion circuits 4A, 4B, 4C, etc. of the modulation format conversion unit 4, the QPSK demodulation circuit 23 and the QAM modulation circuit converts the modulation format of the signals corresponding to each of the carrier waves of the CS broadcasting signals from QPSK into 64-QAM, the ECC decoder 24 and the ECC encoder 25 reassigns error correction codes for the signals, and the frequency conversion circuit 27 frequency-shifts the signals into a vacant channel for terrestrial broadcasting. Thus, the CS signals from a single transponder having a bandwidth of, for example, 27 MHz, are accommodated in a narrower bandwidth, for example, 6 MHz, and the signals are then frequency-shifted into a vacant channel in the VHF band or the UHF band for terrestrial broadcasting.

The output of each of the conversion circuits 4A, 4B, 4C, etc. are fed to the mixer 33. The output of the mixer 33 is fed to an output terminal 34.

Figure 6:
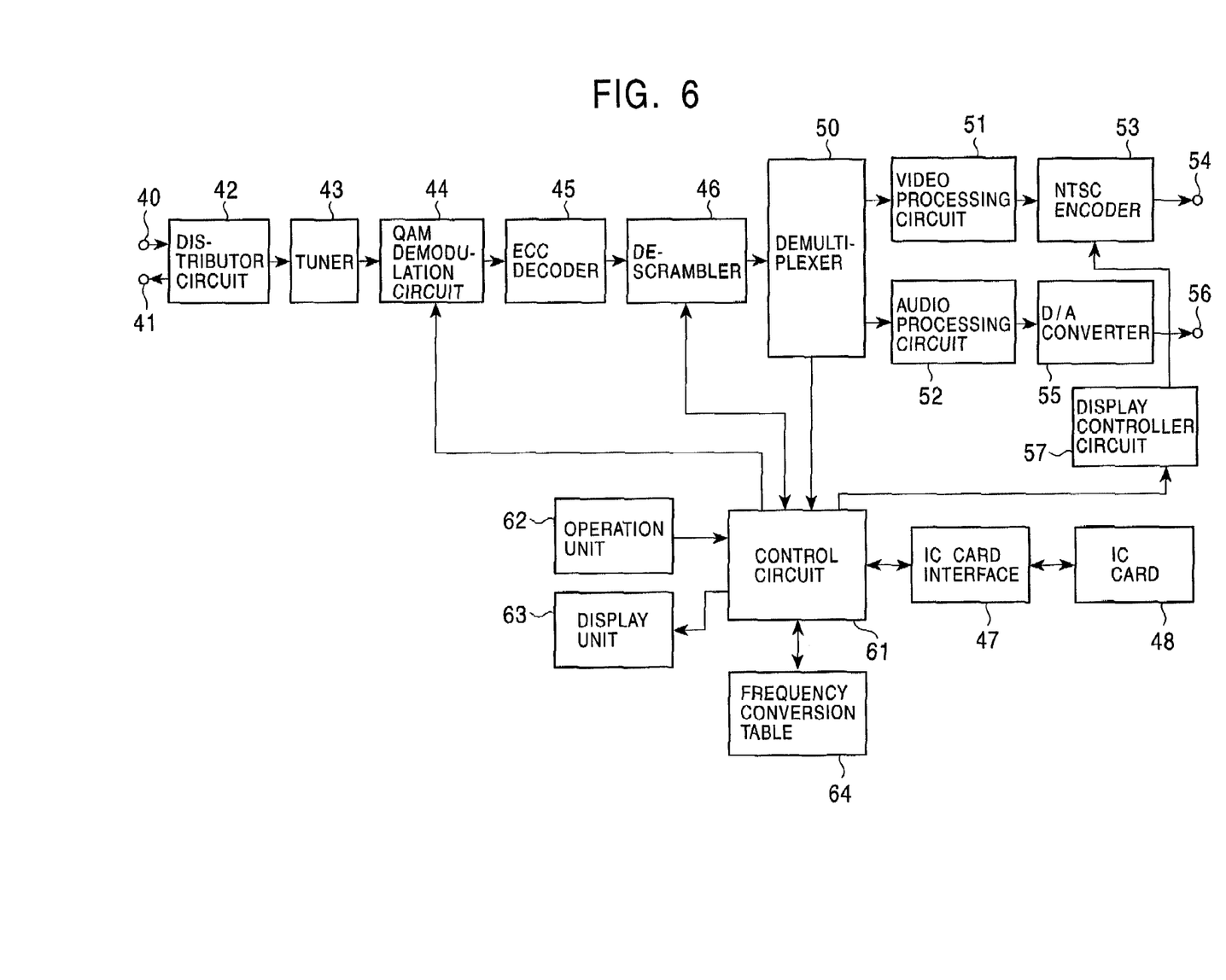
FIG. 6 is a block diagram of an example of a CS tuner in the embodiment.

FIG. 6 shows an example of the configuration of the CS tuner 13 in FIG. 4. Referring to FIG. 6, signals transmitted via the cable 10 are fed to an input terminal 40.

The signals input to the input terminal 40 is fed to a tuner circuit 43 via a distributor circuit 42. The signals input to the input terminal 40 is also output to an output terminal 41 via the distributor circuit 42. The output from the output terminal 41 is fed to the RF input terminal of the television receiver 11 so that terrestrial broadcasting signals in the VHF and UHF bands are received.

The tuner circuit 43 selects signals at a desired frequency from the CS signals shifted into a vacant channel in the VHF band or the UHF band. The output of the tuner circuit 43 is fed to a QAM demodulation circuit 44. The QAM demodulation circuit 44 demodulates the signals modulated by 64-QAM. The output of the QAM demodulation circuit 44 is fed to an ECC decoder 45. The ECC decoder 45 performs processing for error correction using Reed-Solomon codes.

The output of the ECC decoder 45 is fed to a descrambler 46. The descrambler 46 is supplied with received ECM (Entitlement Control Message) data, EMM (Entitlement Management Message) data, and key data for descrambling, obtained by using an IC card 48 plugged into an IC card interface 47.

The descrambler 46 descrambles an MPEG2 transport stream using the received ECM data, EMM data, and the key data in the IC card 48. The descrambled MPEG2 transport stream is fed to a demultiplexer 50.

Based on instructions from a control circuit 61, the demultiplexer 50 separates desired packets from the stream fed from the descrambler 46. Each of the transmitted packets includes a packet identifier (PID) in the header thereof. Based on the PID, the demultiplexer 50 separates video packets, audio packets, and PSI (Program Specific Information) for a desired program. The video packets are sent to a video processing circuit 51, the audio packets are sent to an audio processing circuit 52, and the PSI is sent to the control circuit 61.

The video processing circuit 51 receives MPEG2 video packets from the demultiplexer 50, and decodes the packets to obtain video data. The video data is fed to an NTSC encoder 53, in which the video data is encoded in NTSC format.

The NTSC encoder 53 is connected to a display controller circuit 57. The display controller circuit 57 serves to form various images on the screen based on control signals from the control circuit 61. The output of the NTSC decoder 53 is fed to a video output terminal 54. The video output terminal 54 outputs composite signals in NTSC format.

The audio processing circuit 52 receives MPEG2 audio packets from the demultiplexer 50, and decodes the audio packets to obtain uncompressed audio data. The output of the audio processing circuit 52 is fed to a D/A converter 55 so as to be converted into analog audio signals. The analog audio signals are output to an audio output terminal 56.

The setting for the CS tuner 13 is made via an operation unit 62, and the setting is displayed in a display unit 63. The control circuit 61 is provided with a frequency conversion table 64. The frequency conversion table 63 shows the correspondence between the frequency information of the satellite system shown in NIT (Network Information Table) and the frequency information of the transmission system of the signals transmitted via the cable 10. The frequency conversion table 64 is referenced when the receiving frequency is set in the tuner circuit 43.

In CS broadcasting, PSI is sent together with video packets and audio packets. NIT is included in PSI, and describes carrier waves characteristics (polarization plane, frequency, etc.) and a list of channels multiplexed on the carrier waves.

An ordinary CS broadcast receiver obtains NIT including information regarding carrier frequency characteristics, and based thereon, set the receive frequency to a desired channel. Then, reference is made to PAT (Program Association Table) packet. PAT includes information regarding channels on the carrier waves, and PID for PMT (Program Map Table) representing the contents for each of the channels. Based on the PAT information, video packets and audio packets for a desired channel on the carrier waves are separated, so that a desired program is received.

In accordance with the system, however, the CS intermediate frequency signals are frequency-shifted into a vacant channel in the VHF band or in the UHF band in the modulation format conversion unit 4 when the signals are transmitted to each household via the cable 10; thus, it is not feasible to set receive frequency directly from NIT information. It may be possible, but very complex, to rewrite NIT information when the signals are frequency-shifted in the modulation format conversion unit 4.

Accordingly, in this embodiment, a frequency conversion table 54 is provided. The frequency conversion table stores the correspondence between frequency information for the satellite system obtained from the NIT and frequency information for the signal transmitted via the cable 10.

Figure 7:
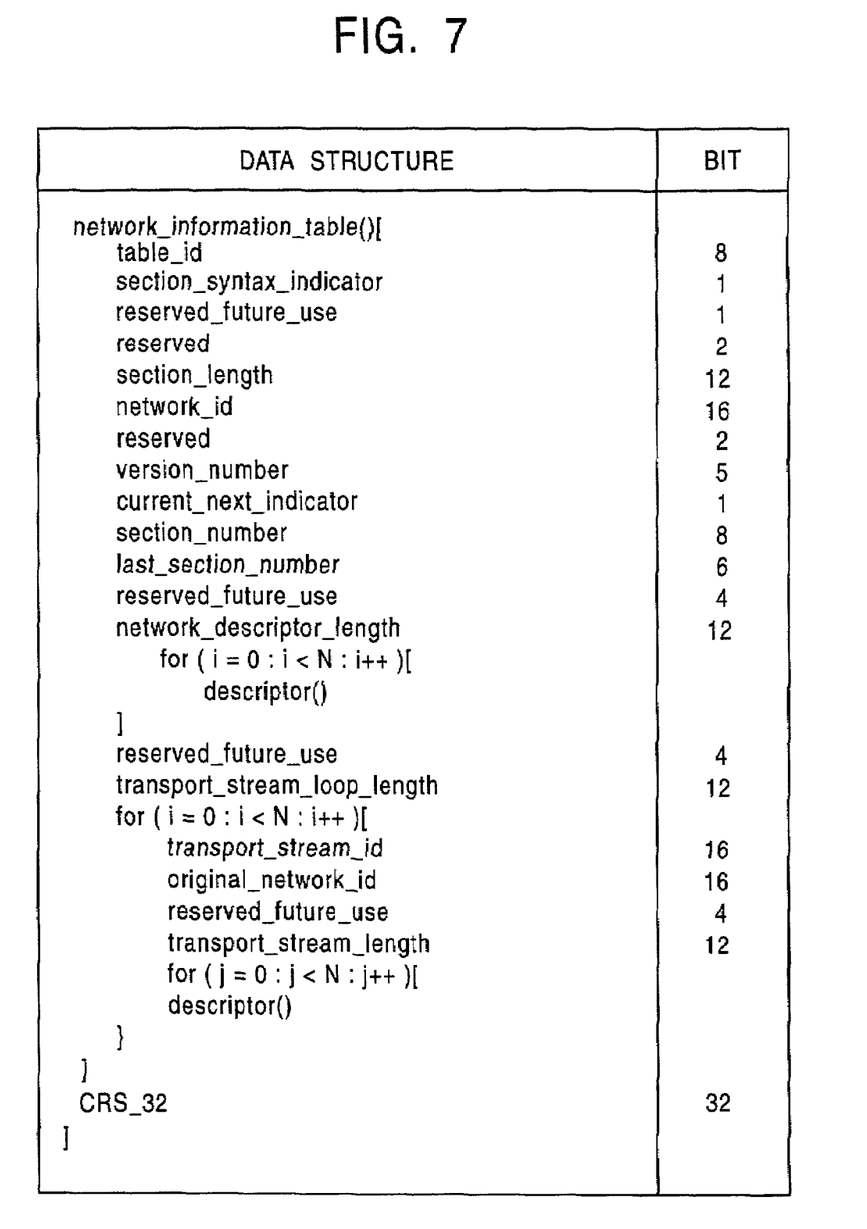
FIG. 7 is a table showing an example of NIT information.

In order to receive a desired program, NIT information must be obtained. NIT information is not frequently updated, and is provided once a day and stored in a storage medium within the receiver apparatus. FIG. 7 shows the data structure of NIT. NIT includes satellite delivery descriptor which describes frequency information and transmission parameters required to receive the signals.

Figure 8:
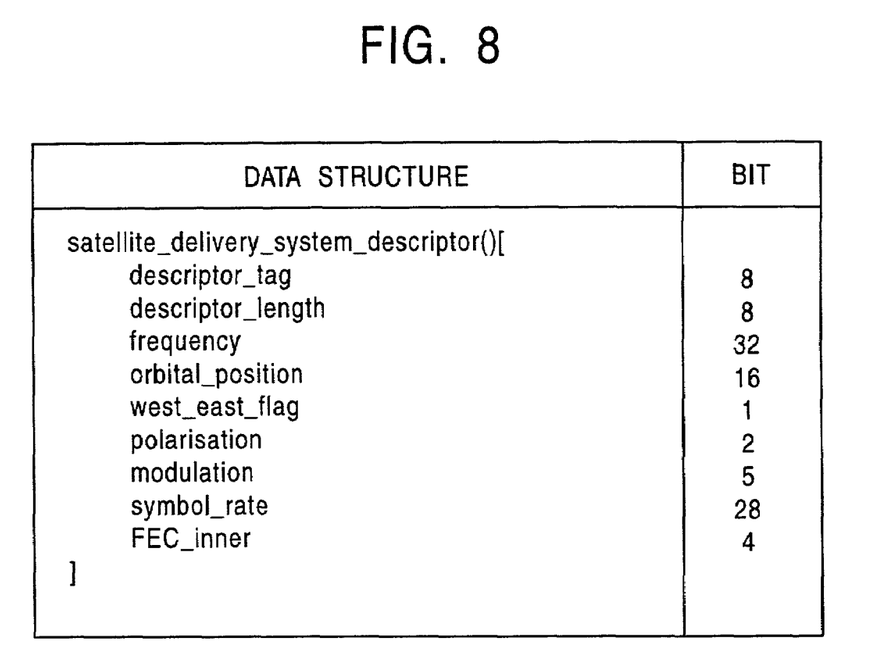
FIG. 8 is a table showing an example of satellite delivery descriptor.
Figure 9:
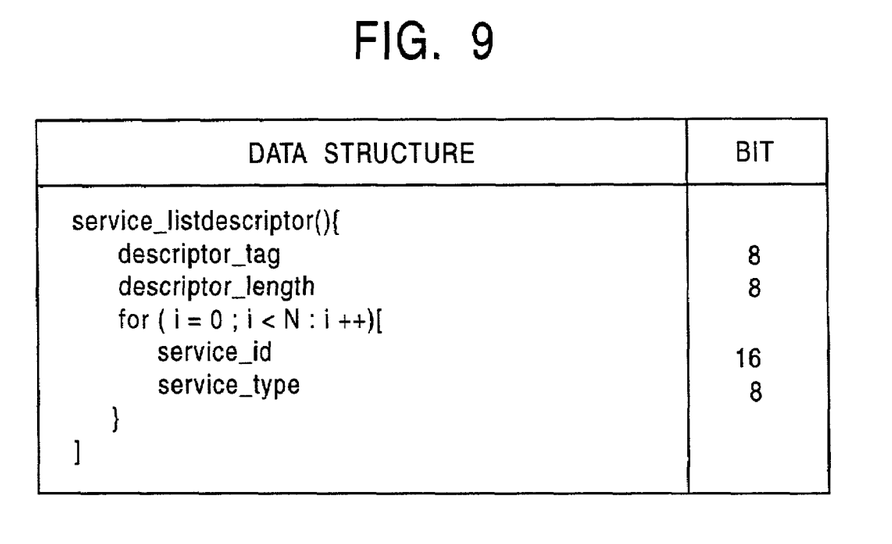
FIG. 9 is a table showing an example of service list descriptor.

FIG. 8 shows the data structure of the satellite delivery descriptor. Information regarding programs for each channel is described in service list descriptor included in NIT. The data structure of the service list descriptor is shown in FIG. 9.

In receive operation, first, information regarding the channel, i.e., frequency band, including a desired program is obtained from the service list descriptor and the satellite delivery descriptor included in NIT. Then, a frequency of the cable transmission system corresponding to the obtained frequency is read from the frequency conversion table 64. The receive frequency of the tuner circuit 43 is set in accordance with the frequency read from the frequency conversion table 64.

Then, reference is made to PAT packets, and based on PAT information, video packets and audio packets with PID corresponding to a desired channel are separated, so that a desired program is received.

Figure 10:
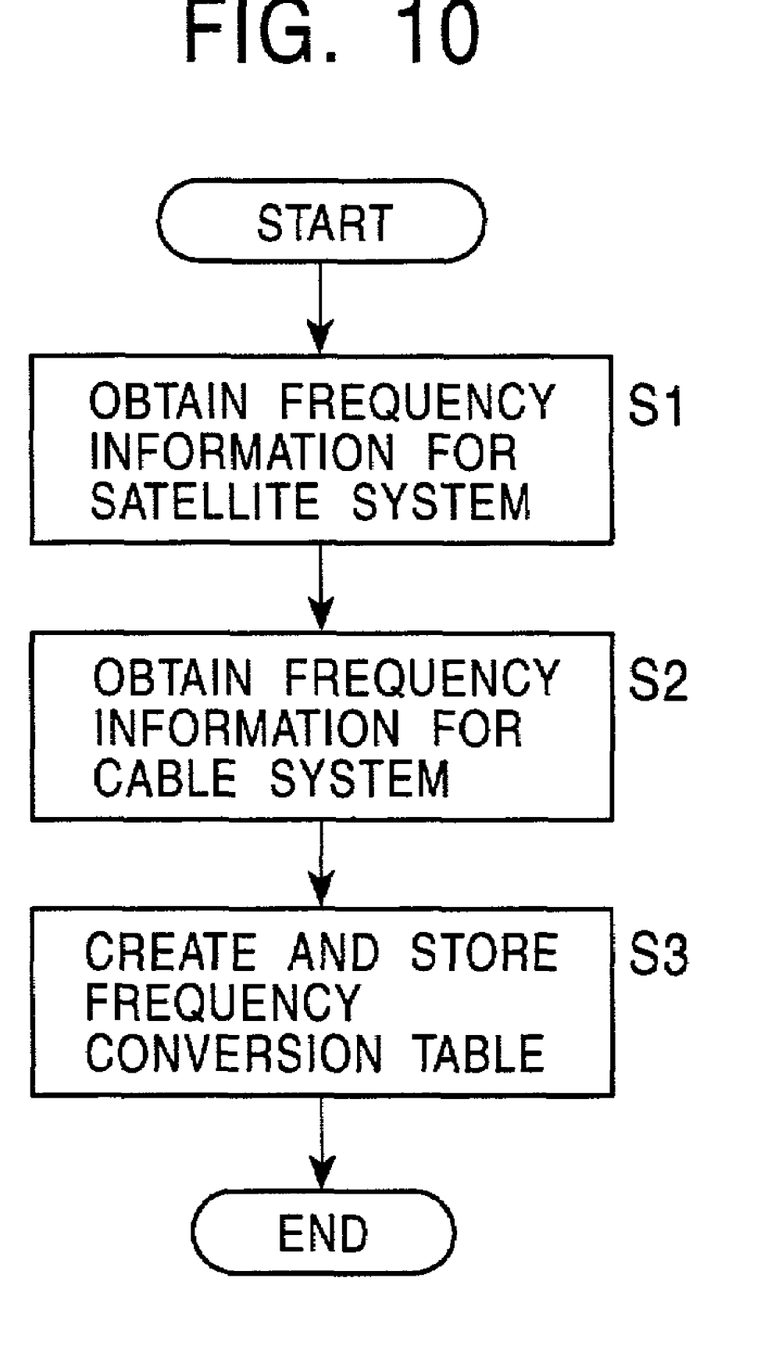
FIG. 10 is a flowchart of an operation for creating a frequency conversion table in the embodiment.

The frequency conversion table 64, which shows the correspondence between the frequency information of the satellite system described in NIT included in data transmitted from a satellite, and actual frequency information of the signals transmitted via the cable 10, is created when the system is initially powered on after the system is configured, in a processing as shown in FIG. 10.

FIG. 10 is a flowchart showing an example of processing for creating the frequency conversion table 64 which shows the correspondence between the frequency information described in NIT of the satellite system and the frequency information of the cable transmission system. Referring to FIG. 10, in step S1, a desired channel is specified, for example, via a menu displayed on the screen, so that corresponding QAM signals are received and NIT information is obtained.

In a television signal transmission system, once the frequency information of the cable transmission system is set, the information need not be frequently updated. In addition, channel information in the initial setting can be notified to the viewers by, for example, those in charge of management of the relevant facility. Thus, in step S2, the frequency information of the cable transmission system is input via, for example, initial setting menu displayed on the screen. Accordingly, the frequency conversion table 64, which shows the correspondence between the frequency information of the satellite system and the frequency information of the cable transmission system, is created and stored in memory in step S3. Because the channels for retransmission of the CS signals are fixed, i.e., the bands A2 and A4 in FIG. 3, the setting of frequency information can be made in accordance with the setting of the modulation format conversion unit 4 prior to shipping of receiver apparatuses.

Figure 11:
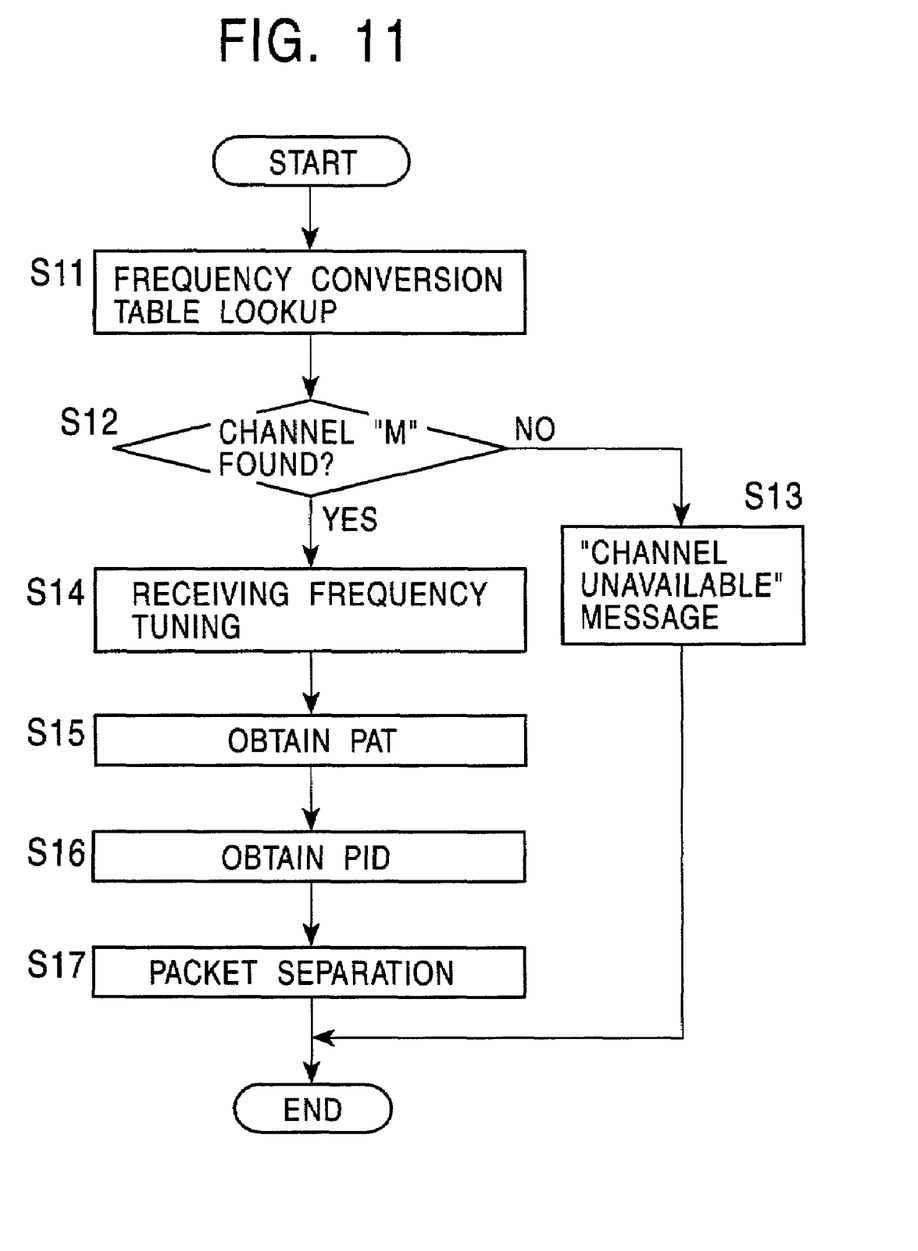
FIG. 11 is a flowchart of an operation for selecting a desired channel in the embodiment.

FIG. 11 is a flowchart of a processing for selecting a desired channel "M".

Referring to FIG. 11, first, reference is made to the frequency conversion table 64 in step S11. In step S12, it is determined whether the channel exists. If the "M" channel is not found, a "channel unavailable" message is displayed in step S13 to exit processing.

If the channel "M" is found in step S12, the frequency of the cable transmission system corresponding to the channel "M" is obtained from the frequency conversion table 64, and the receive frequency of the tuner circuit 43 is set thereto in step S14.

Then, PAT is obtained for searching the channel "M" in step S15.

When PAT is obtained, PID for PMT representing the contents of channel "M" is obtained from PAT in step S16.

Using the PID obtained in step S16, in step S17, video packets, audio packets, and ECM packets for descrambling are separated, and video data and audio data are decoded.

In accordance with the above-described embodiment, the modulation format of CS intermediate frequency signals is converted from QPSK into 64-QAM so that the signals are accommodated in a narrower bandwidth, and the signals are then frequency-shifted into a vacant band in the VHF mid band, the VHF super high band, or the UHF band. Accordingly, the CS broadcasting signals, even if serviced by two satellites, are allowed to be transmitted in a single cable together with BS broadcasting signals and terrestrial broadcasting signals.

It is to be appreciated that although the modulation format is converted from QPSK into 64-QAM in the above-described embodiment, the present invention is not limited thereto, and the conversion may be any type from a modulating format compatible with signals from satellites to a modulating format which accommodates the signals in a narrower bandwidth which allows transmission in a single channel for terrestrial broadcasting.

Furthermore, although the modulation format conversion unit 4 in the above-described embodiment performs conversion of modulation format and reassignment of error correction codes, the reassignment of error correction codes may be omitted. However, the reassignment of error correction code should preferably be incorporated so that the modulation format and the error correction coding format of the CS broadcasting signals transmitted via the cable 10 will be the same as those of the modulation format and the error correction coding format of digital CATV. This allows a settop box for digital CATV and the CS tuner to share a common chip, serving to reduce relevant cost.

It should also be appreciated that in the above-described embodiment, the modulation format conversion unit 4 does not alter the digital data from the satellite system except for the modulation format. Thus, subscription contracts and copyright protection will be implemented in the same manner as in the conventional CS broadcasting services. Thus, each household is allowed to enjoy CS broadcasting services just by making a subscription contract with a management company of CS broadcasting service, just like for the conventional CS broadcasting services.

What is claimed is:

1. A receiver apparatus comprising:
   means for receiving a first signal from a first satellite;
   means for receiving a second signal from a second satellite, wherein the first signal and the second signal have undergone conversion of modulation format to have a narrower bandwidth, and one of the first and second narrowed bandwidth signals has been frequency-shifted into a frequency band between VHF low band and VHF high band and the other of the first and second narrowed bandwidth signal has been frequency shifted into a vacant frequency band;
   means for demodulating the first and second signals in accordance with corresponding modulation formats after conversion;
   means for decoding the output from said demodulating means to obtain video signals and audio signals; and
   means for storing a frequency conversion table containing correlation information between respective carrier wave frequencies for the first and second signals before frequency shifting and frequencies of corresponding frequency-shifted signals, said frequency conversion table being created based on network information table (NIT) information included in the first and second signals and information regarding the frequencies of the received signals, the NIT including a service list descriptor that includes information regarding channel information for each carrier wave frequency;
   means for receiving a command to display content corresponding to a channel number, said NIT including information indicating that said channel number corresponds to said carrier wave frequency for one of said first and second signals; and
   means for accessing the frequency conversion table, obtaining the frequency shifted signal that corresponds to the carrier wave indicated by the channel number, and tuning to the corresponding frequency-shifted signal so that the content corresponds to the channel number originally assigned to the carrier wave frequency in the NIT.

2. The receiver apparatus of claim 1, wherein said receiver apparatus is set to a corresponding frequency obtained from said frequency conversion table without being set to the selected carrier wave frequency for one of said first and second signals.

3. A television signal transmission system comprising:
   a television signal distribution apparatus configured to deliver signals received via each of a first and second antenna to at least one receiver apparatus;
   wherein said television signal distributor apparatus comprises:
   the first antenna configured to receive a first signal from a first satellite;
   the second antenna configured to receive a second signal from a second satellite;
   a modulation format converter configured to simultaneously convert a modulation format and narrow a bandwidth of the first and second signals, said modulation format converter also configured to frequency-shift one of the first and second narrowed bandwidth signals into a frequency band between VHF low band and VHF high band and the other of the first and second narrowed bandwidth signal into a vacant frequency band; and
   a mixer configured to mix the narrower bandwidth signals in the vacant frequency band with at least one other type of received signals for transmission via a cable;
   and wherein said at least one receiver apparatus comprises:
   means for receiving the narrower bandwidth signals in the vacant frequency band;
   means for demodulating the narrower bandwidth signals in the vacant frequency band in accordance with corresponding modulation formats after conversion;
   means for decoding the output from said demodulating means to obtain video signals and audio signals; and
   means for storing a frequency conversion table containing correlation information between respective carrier wave frequencies for the first and second signals before frequency shifting and frequencies of corresponding frequency-shifted signals, said frequency conversion table being created based on network information table (NIT) information included in the first and second signals and information regarding the frequencies of the received signals, the NIT including a service list descriptor that includes information regarding channel information for each carrier wave frequency;

means for receiving a command to display content corresponding to a channel number, said NIT including information indicating that said channel number corresponds to said carrier wave frequency for one of said first and second signals; and means for accessing the frequency conversion table, obtaining the frequency shifted signal that corresponds to the carrier wave indicated by the channel number, and tuning to the corresponding frequency-shifted signal so that the content corresponds to the channel number originally assigned to the carrier wave frequency in the NIT.

4. A television signal transmission system according to claim 3, wherein:

said modulation format converter is configured to convert the modulation format of the first and second signals from QPSK to QAM.

5. A television signal transmission system according to claim 3, wherein:

the first and second signals are provided via two or more satellites.

6. The television signal transmission system of claim 3, wherein said receiver apparatus is set to a corresponding frequency obtained from said frequency conversion table without being set to the selected carrier wave frequency for one of said first and second signals.

7. A television signal transmission method, comprising the steps of:

receiving a first signal from a first satellite;

receiving a second signal from a second satellite;

converting a modulation format of the first and second signals, simultaneously, to narrow a bandwidth of the signals; frequency-shifting, simultaneously, one of the first and second narrowed bandwidth signals into a frequency band between VHF low band and VHF high band and the other of the first and second narrowed bandwidth signal into a vacant frequency band;

mixing the frequency-shifted and bandwidth narrowed signals with at least one other type of received broadcast signals;

transmitting the mixed signals to said at least one receiver apparatus via a cable;

demodulating the received mixed signals in accordance with modulation format after conversion;

decoding the demodulated signals to obtain video signals and audio signals;

storing a frequency conversion table containing correlation information between respective carrier wave frequencies for the first and second signals before frequency shifting and frequencies of corresponding frequency-shifted signals, said frequency conversion table being created based on network information table (NIT) information included in the first and second signals and information regarding the frequencies of the received signals, the NIT including a service list descriptor that includes information regarding channel information for each carrier wave frequency;

receiving a command to display content corresponding to a channel number, said NIT including information indicating that said channel number corresponds to said carrier wave frequency for one of said first and second signals;

accessing the frequency conversion table;

obtaining the frequency shifted signal that corresponds to the carrier wave indicated by the channel number; and tuning to the corresponding frequency-shifted signal so that the content corresponds to the channel number originally assigned to the carrier wave frequency in the NIT.

8. A television signal transmission method according to claim 7, wherein:

the modulation format converter is configured to convert the modulation format of the first and second signals from QPSK to QAM.

9. A television signal transmission method according to claim 7, wherein:

the first and second signals are provided via two or more satellites.

10. The television signal transmission method of claim 7, wherein the receive frequency of said at least one receiver apparatus is set to a corresponding frequency obtained from said frequency conversion table without being set to the selected carrier wave frequency of the selected first and second signals.

11. A receiver apparatus comprising:

a first receiving unit configured to receive a first signal from a first satellite;

a second receiving unit configured to receive a second signal from a second satellite, wherein the first signal and the second signal have undergone conversion of modulation format to have a narrower bandwidth, and one of the first and second narrowed bandwidth signals has been frequency-shifted into a frequency band between VHF low band and VHF high band and the other of the first and second narrowed bandwidth signal has been frequency shifted into a vacant frequency band;

a demodulating unit configured to demodulate the first and second signals in accordance with corresponding modulation formats after conversion;

a decoding unit configured to decode the output from said demodulating unit to obtain video signals and audio signals; and a storing unit configured to store a frequency conversion table containing correlation information between respective carrier wave frequencies for the first and second signals before frequency shifting and frequencies of corresponding frequency-shifted signals, said frequency conversion table being created based on network information table (NIT) information included in the first and second signals and information regarding the frequencies of the received signals, the NIT including a service list descriptor that includes information regarding channel information for each carrier Wave frequency;

a command receiving unit configured to receive a command to display content corresponding to a channel number, said NIT including information indicating that said channel number corresponds to said carrier wave frequency for one of said first and second signals; and an accessing unit configured to access the frequency conversion table, to obtain the frequency shifted signal that corresponds to the carrier wave indicated by the channel number, and to tune to the corresponding frequency-shifted signal so that the content corresponds to the channel number originally assigned to the carrier wave frequency in the NIT.

* * * * *